US005677366A

United States Patent [19]
Wu

[11] Patent Number: 5,677,366
[45] Date of Patent: Oct. 14, 1997

[54] SEEDED MICROEMULSION POLYMERIZATION FOR THE PRODUCTION OF SMALL POLYMER PARTICLES

[75] Inventor: Huey Shen Wu, Newark, Del.

[73] Assignee: W. L. Gore & Associates, Inc., Newark, Del.

[21] Appl. No.: 723,368

[22] Filed: Sep. 30, 1996

Related U.S. Application Data

[60] Continuation of Ser. No. 445,317, May 19, 1995, abandoned, which is a division of Ser. No. 258,017, Jun. 10, 1994, Pat. No. 5,523,346.

[51] Int. Cl.$^6$ ................................................ C08L 83/00
[52] U.S. Cl. ................................ 523/201; 525/902
[58] Field of Search .......................... 523/201; 525/902

[56] References Cited

U.S. PATENT DOCUMENTS

| | | |
|---|---|---|
| 3,407,247 | 10/1968 | Reinhardt . |
| 3,424,706 | 1/1969 | Smith et al. . |
| 3,607,878 | 9/1971 | Oullins et al. . |
| 4,025,481 | 5/1977 | Tournut et al. . |
| 4,038,231 | 7/1977 | Downer et al. . |
| 4,615,584 | 10/1986 | Ohmori et al. ........................ 526/245 |
| 5,030,667 | 7/1991 | Shimizu et al. ........................ 525/902 |
| 5,187,769 | 2/1993 | Groh et al. ............................ 526/245 |

FOREIGN PATENT DOCUMENTS

| | | |
|---|---|---|
| 0182516 | 5/1986 | European Pat. Off. . |
| 0194534 | 9/1986 | European Pat. Off. . |
| 0518073 | 12/1992 | European Pat. Off. . |
| WO9422928 | 9/1993 | WIPO . |

*Primary Examiner*—Peter D. Mulcahy
*Attorney, Agent, or Firm*—Gary A. Samuels

[57] ABSTRACT

In this invention an aqueous seeded microemulsion polymerization procedure is provided in which colloidal polymer particles are produced from tetrafluoroethylene or tetrafluoroethylene/comonomer or other polymerizable monomers. The particles have an average diameter between 1 to 100 nanometer (0.001–0.1 micrometer) preferably 1 to 80 (0.001–0.08 micrometer), more preferably 5 to 100 nanometer (0.005–0.1 micrometer). A microemulsion is formed of a liquid monomer in water and a gaseous monomer is added either before or after polymerization is initiated.

1 Claim, No Drawings

SEEDED MICROEMULSION POLYMERIZATION FOR THE PRODUCTION OF SMALL POLYMER PARTICLES

This application is a continuation of application Ser. No. 08/445,317 filed May 19, 1995, now abandoned, which is a division of application Ser. No. 08/258,017, filed Jun. 10, 1994 now U.S. Pat. No. 5,523,346.

FIELD OF THE INVENTION

The invention relates to a seeded microemulsion polymerization process to produce polymers such as polytetrafluoroethylene and its copolymers of small particle size.

BACKGROUND OF THE INVENTION

Microemulsions are known in the art. They are stable isotropic mixtures of oil, water, and surfactant which form spontaneously upon contact of the ingredients. Other components, such as salt or co-surfactant (an alcohol, amine, or other amphiphilic molecule) may also be part of the microemulsion formulation. The oil and water reside in distinct domains separated by an interfacial layer rich in surfactant. Because the domains of oil or water are small, microemulsions appear visually transparent or translucent. Unlike emulsions, microemulsions are equilibrium phases.

Microemulsions can have a variety of microstructures, depending mainly upon composition and temperature. The common structural feature is the presence of a surfactant-rich sheet or film separating oil-rich and water-rich domains. There are three most common structures. One is the so-called water-in-oil microemulsions, in which water is contained inside distinct domains (droplets) in a continuous oil-rich domain. A second is oil-in-water microemulsions in which oil is contained inside distinct domains in a continuous water-rich domain. The third is bicontinuous microemulsions in which there are sample-spanning intertwined paths of both oil and water, separated from each other by the surfactant-rich film (a sponge-like structure).

A microemulsion can be distinguished from a conventional emulsion by its optical clarity, low viscosity, small domain size, thermodynamic stability, and spontaneous formation. Microemulsion polymerization has several advantages over traditional emulsion polymerization. First, emulsions are turbid and opaque, while microemulsions are usually transparent or translucent and so are particularly suitable for photochemical reactions. Second, microemulsion polymerization enables preparation of stable, monodispersed colloidal dispersions containing particles that am smaller than particles produced with classical emulsion polymerization processes. Finally, the structural diversity of microemulsions (droplet and bicontinuous) is set by thermodynamics, and rapid polymerization may be able to capture some of the original structure.

Coating substrates with fluorinated polymers is known in the art. In order to produce a thin uniform coating, such processes normally require expensive and/or environmental-hazardous fluorinated solvents, such as CFCs. Moreover, water-based emulsion polymerization of fluorinated monomers usually yields particles with size in the range of 0.1–10 micrometer, which sometimes makes it difficult to give uniform coatings on porous substrates having submicron pore structures. In addition, such large particle sizes result in coatings that can clog the pores of submicron pore structures, which is undesirable in many applications.

Fluoropolymers containing tetrafluoroethylene generally have superior thermal stability to other polymers. It would be desirable to provide new microemulsions polymerization technique involving tetrafluoroethylene to produce polymers of very small particle sizes. It would also be desirable to provide coated substrates in which the coatings are made from the small polymer particles.

SUMMARY OF THE INVENTION

In this invention an aqueous seeded microemulsion polymerization procedure is provided in which colloidal polymer particles are produced from tetrafluoroethylene or tetrafluoroethylene/comonomer or other polymerizable monomers. The particles have an average diameter between 1 to 100 nanometer (0.001–0.1 micrometer) preferably 1 to 80 (0.001–0.08 micrometer), more preferably 5 to 50 nanometer (0.001–0.05 micrometer).

The aqueous seeded microemulsion polymerization procedure involves the following steps:

(1) a microemulsion of polymerizable unsaturated liquid monomer(s) in water is formed as the seed;

(2) the seeded monomeric microemulsion is free radical polymerized by charging free radical initiator to start the polymerization reaction; and (3) tetrafluoroethylene or tetrafluoroethylene/comonomer or other gaseous monomer(s) is introduced to the microemulsion system from gas phase either before or after the microemulsion polymerization of step 2 starts.

The tetrafluoroethylene and other gaseous monomers participate in the polymerization and produce small particles of polymers.

The polymerizable liquid monomers used in step (1) can be any unsaturated, free-radical polymerizable liquid organic monomer, preferably a fluorinated one. It forms an oil-in-water microemulsion at the polymerization temperature, which can be between 0° and 150° C., preferably 40° and 100° C. The microemulsion of the polymerizable liquid monomers has an average particle size in the range of 1 to 100 nanometer (0.001 to 0.1 micrometer), preferably 1 to 80 nanometers (0.001 to 0.08 micrometer), and most preferably 1–50 nanometers.

In step (2), when the gaseous monomer(s) are introduced to the reactor into the aqueous phase before the microemulsion polymerization starts, the final particles generally contain random copolymers. On the other hand, when the gaseous monomer(s) are introduced after liquid monomers from step (1) are polymerized, the gaseous monomer(s) transferred from gas phase into aqueous phase can be polymerized and precipitated on the outer surface of the seeded polymeric particles and yields a core/shell particle structure. The core/shell particles can have a polymer core of 0.1 to 99% by weight, and a polymer shell, 1 to 99.9% by weight, containing the monomer units from gas phase, preferably containing tetrafluoroethylene units.

In one aspect, the process comprises:

a) combining in a pressure reaction vessel a liquid organic ethylenically unsaturated polymerizable monomer with a surfactant in water, at a temperature and ratio of monomer to surfactant sufficient to spontaneously form a microemulsion, b) charging a gaseous fluorinated organic ethylenically unsaturated monomer to the reactor, and c) initiating reaction of monomers by addition of a free-radical initiator to the reactor.

In one variant step c) is carried out before step b); and in another variant, step b) is carried out before step c).

DETAILED DESCRIPTION OF THE INVENTION

The preparation of the polymeric particles of the invention depends on careful selection of the ingredients of the seeded monomeric microemulsions. The seeded monomeric microemulsions of the invention are prepared by mixing water, unsaturated liquid organic monomers, surfactants, and optionally cosolvents or inorganic salts. In order for the microemulsion to form with monomer in it, the monomer must be in liquid form. When the ingredients and amounts are selected for certain operating temperatures, the microemulsion forms spontaneously. The surfactant can be any organic surfactant, but preferable is a fluorinated anionic surfactant, e.g., a salt of fluorinated carboxylic acids, fluorinated sulfuric acids, fluorinated sulfates, fluorinated ammonium salts, fluorinated nomonic surfactants and the like. The ratio of surfactants to other monomers present will usually be 0.5 to 6 or more (by weight).

The liquid organic monomers can be any unsaturated monomer polymerizable by free-radical initiation. For example, these monomers can be selected from the classes of acrylates, methacrylates, styrene, acrylonitriles, vinyls, alkyls or alkenes and the like. Preferably, the monomers will be fluorinated, but for purposes of this invention the seed monomer will not be tetrafluoroethylene. Representative monomers include:

acrylates: alkyl acrylates, fluoroalkyl acrylates, chloroalky acrylates, bromoalkyl acrylates, and the like, of less than 25 carbons, methacrylates: alkyl methacrylates, fluoroalkyl methacrylates, chloroalkyl methacrylates, bromoalkyl methacrylates, and the like, of less than 25 carbons, styrenes: styrene, methylstyrene, fluorostyrene, chlorostyrene, bromostyrene, and the like, acrylonitriles: acrylonitrile, methacrylonitrile, and the like, vinyls: vinyl acetate, vinylidene chloride, alkyl vinyl ether, fluoroalkyl vinyl ether, and the like, allyl compounds: allyl acetate, allyl chloride, allyl bromide, and the like, alkenes: hydrocarbons, fluorocarbons, chlorocarbons, or bromocarbons with carbon atom content number per molecule at least 4, and less than 20 carbons, such as hexene, heptene, octene, decene, fluorohexene, fluoroheptene, fluorooctene, fluorodecene, and the like.

Preferably, the liquid monomer will be a fluoroacrylate or methacrylate.

The amounts of ingredients employed are 0.1–40 weight percent, preferably 0.1–20, of the monomers; 0.1–40 weigh percent, preferably 0.1–25, of the surfactant; with the remainder water.

To initiate polymerization of the seeded microemulsions described above, the temperature of the monomeric microemulsion is adjusted to between 0° and 150° C., preferably 40° to 100° C. Initiators can be water soluble or oil soluble free-radical initiators, such as persulfates, azo initiators, peroxides, or photo initiators which can generate free radicals by ultraviolet or gamma my activation. Initiation may also be used. Amount of initiators present can range from 0.01 to 20 percent by weight based on the liquid monomer content. Cosolvents such as an alcohol, amines or other amphiphilic molecules, or salt can be employed if desired to facilitate formation of the microemulsion. Introduction of initiators cause the polymerization of monomers to begin.

The gaseous monomer can be introduced either before the initiator is added, or after. If before, the liquid monomer polymerizes and the gaseous monomer and the resulting polymer products include a number of types of particles. For example, the particles can include a homopolymer of the liquid monomer, or a homopolymer of the gaseous monomer, or a random copolymer of units of both, depending upon the relative polymerization rates of each monomer.

If, on the other hand, the gaseous monomer is introduced after polymerization of the liquid monomer begins, the polymerizable particles will have a core/shell morphology. The core will be comprised of homopolymer of the liquid monomer. If almost all the liquid monomer is polymerized before the gaseous monomer is added, then a shell of the gaseous homopolymer will form around the core. But if not all the liquid monomer is polymerized when the gaseous monomer is added, then a copolymer of the liquid and the gaseous monomers will form a shell around the core.

Preferably, the gaseous monomers will be an unsaturated monomer polymerizable by free-radical initiation and will be an olefin, either halogen-containing or non-halogen containing. Examples include tetrafluoroethylene, vinyl fluoride, vinylidene fluoride, trifluoroethylene, hexafluoropropylene, perfluoroalkyl vinyl ether, perfluoroalkyl ethylene, chlorotrifluoroethylene, vinyl chloride, vinylidene chloride, ethylene, propylene, butylene, and butadiene or a combination of any of them.

Preferably, the gaseous monomer will be fluorinated, and more preferable will be terafluoroethylene or a mixture containing tetrafluoroethylene. Of course, the gaseous monomer will not be the same as the liquid monomer used.

Sufficient mixing between liquid and gaseous phases is important to encourage mass transfer. The polymerization temperature can range from 0° to 150° C. and preferably 40° to 100° C. The polymerization is carried out in a pressure vessel and polymerization pressures can range from 200 to 200,000 KPa and preferably 200 to 20,000 KPa. The polymerization proceeds for 1–500 minutes or until at least 50% of the liquid monomers are converted to polymer. The amount of gaseous monomer used can be measured by measuring the pressure in the reactor.

The resulting polymer particle latex has an average particle size of between 1 to 100 nanometer, preferably 1 to 80, most preferably 1 to 50, and a polymer average molecular weight of over 10,000, preferably over 50,000. The small particle size provides a polymer system with a number of advantages over systems containing larger particles. The system is a colloidal dispersion and is usually clear rather than turbid. The small particle size aids in producing coatings of uniform thickness and maintains good gas permeability of porous substrates. The tetrafluoroethylene or other fluorinated monomer units in the polymer chain aids in increasing the thermal stability, hydrophobicity and oleophobicity of the substrates to which the polymer is applied.

The polymer so produced can be applied directly from the colloidal dispersion by immersing the substrate material into the dispersion, or by painting the substrate with the dispersion, or by spraying the dispersion onto the substrate. Suitable substrates include fabrics, woven or nonwoven materials, screens, paper, or porous or microporous membranes of any form including sheets or tubes. Once the coating is applied to the substrate, any water, surfactant or initiators remaining can be drawn off by any convenient means, such as heating, steam stripping, vacuum evaporation or the like.

The resulting product is a coated substrate with the coating present as a surface layer if the substrate is nonporous. For porous substrates, which include ones made from porous polymer membranes; and especially microporous polymeric membranes, the coating is ordinarily present as a coating on the internal structure of the substrate that makes up the pores. A particularly preferred porous substrate is a microporous polytetrafluoroethylene made by stretching polytetrafluoroethylene tape or film as described in Gore U.S. Pat. No. 3,953,566. In this procedure the structure comprises an interconnected network of nodes and fibrils interconnecting the nodes, the nodes and fibrils comprising the internal structure that defines the pores.

The resulting coated articles provide gas permeable articles of enhanced hydrophobicity and oleophobicity and filtration properties. This makes them useful as gas filters, vent filters and as insulation for electrical wiring. In addition, thin flexible porous films and membranes are useful in garment constructions where oil and water repellency is desired.

TEST PROCEDURES

Particle Size Determination

A COULTER N4MD particle size analyzer was used. The mean diameter is measured using light scattering method with helium laser at scattering angles of 90 degree. Each aqueous dispersion sample was diluted about 10,000 times with deionized water before measurement.

Air Permeability: Gurley Number Test

Gurley numbers were obtained as follows: The resistance of samples to air flow was measured by a Gurley densometer (ASTM D726-58) manufactured by W. & L. E. Gurley & Sons. The results are reported in terms of Gurley Number which is the time in seconds for 100 cubic centimeters of air to pass through 1 square inch of a test sample at a pressure drop of 4.88 inches of water.

Oil Repellency Test

Oil rating was carried out by AATCC Test Method 118-1983. The higher the number, the better the oil repellency. The highest number is 8.

EXAMPLE 1

Tetrafluoroethylene Added Before Polymerization is Initiated

In a 2-liter reactor were added 1000 gram of deionized water, 50 gram of fluoroacrylate monomer (Zonyl TA-N from dupont), and 90 gram of ammonium perfluorooctanoate surfactant (Fluororad FC-143, 3M). The mixture was a transparent microemulsion at 50° C. and was maintained at a stirring speed of about 1200 rpm. The reactor was then vacuumed and purged with tetrafluoroethylene gas three times to ensure oxygen content in the mixture to be below 30 ppm. Then the temperature of the mixture was raised and maintained to be about 75° C., and tetrafluoroethylene gas was charged to the reactor and the pressure inside the reactor was about 1500 kPa. 0.4 gram of ammonium persulfate initiator in 40 gram of water was pumped into the reactor to start the reaction. Reaction proceeded for about 42 minutes and was stopped. At the end of the reaction, the pressure inside the reactor was about 200 KPa, which means a sufficient amount of tetrafluoroethylene used during the polymerization reaction.

The colloid mixture produced from the above reaction is a clear, transparent dispersion. The solid polymer content is about 11.9% by weight. The average polymer particle size is about 26 nanometer (0.026 micrometer). Thermogravimetric analysis results show the polymer contains about 40% by weight of fluoroacrylate-rich portion and 60% by weight of tetrafluoroethylene-rich, based on the fact that 40% by weight of the polymer decomposed in a temperature range of 250° to 460° C., which is a typical decomposition temperature of polyfluoroacrylate; and 60% by weight of the polymer decomposed in a temperature range of 460° to 640° C., which is a typical decomposition temperature range for polytetrafluoroethylene. Differential Scan Calorimetric analysis of the polymer shows three major endotherms at the peaks of 138°, 219° and 324° C.

EXAMPLE 2

Tetrafluoroethylene/Hexafluoropropylene Added Before Reaction Starts

In a 2-liter reactor were added 1000 gram of deionized water, 70 gram of fluoroacrylate (Zonyl TA-N from dupont), 130 gram of ammonium perfluorooctanoate (Fluororad FC-143, 3M). The mixture is a transparent microemulsion at 50° C. and maintained at a stirring speed of about 1200 rpm. The rector was then vacuumed and purged with tetrafluoroethylene gas three times to ensure oxygen content in the mixture to be below 30 ppm. Then the temperature of the mixture was raised and maintained to be about 90° C. A mixture of tetrafluoroethylene and hexafluoropropylene gas was charged to the reactor and the pressure inside the reactor was about 1500 kPa, in which the mole ratio of tetrafluoroethylene to hexafluoroethylene is about 70:30. Then, 0.4 gram of ammonium persulfate in 40 gram of water was pumped into the reactor to start the reaction. Reaction proceeded for about 234 minutes and was stopped. At the end of the reaction, the pressure of the reactor was about 600 kPa.

The colloid mixture produced from the above reaction is a clear, transparent dispersion. The solid polymer content is about 8.4% by weight. The average polymer particle size is about 45 nanometer (0.045 micrometer). Thermogravimetric analysis results show the polymer particles contains about 70% by weight of fluoroacrylate-rich portion and 30% by weight of tetrafluoroethylene-rich portion, based on the fact that 70% by weight of the polymer decomposed in a temperature range of 323° to 460° C., which is a typical decomposition temperature of polyfluoroacrylate, and 30% by weight of the polymer decomposed in a temperature range of 460° to 710° C., which is a typical decomposition temperature range for polytetrafluoroethylene. Differential Scan Calorimetric analysis of the polymer shows three major exotherms at the peaks of 124°, 235° and 305° C.

EXAMPLE 3

Tetrafluoroethylene Added After Reaction Starts

In a 2-liter reactor were added 1000 gram of deionized water, 4 gram of fluoroacrylate (Zonyl TA-N from dupont), 12 gram of ammonium perfluorooctanoate (Fluororad FC-143, 3M). The mixture is a transparent microemulsion at 50° C. and maintained at a stirring speed of about 1200 rpm. The reactor was then vacuumed and purged with tetrafluoroethylene gas three times to ensure oxygen content in the mixture to be below 30 ppm. Then the temperature of the mixture was raised and maintained to be about 85° C. Then, 0.2 gram of ammonium persulfate in 40 gram of water was pumped into the reactor to start the reaction. Reaction proceeded for about 60 minutes. Most fluoroacrylate monomers polymerized and formed ultra small seed polymer particles. Then tetrafluoroethylene gas was charged to the reactor and the pressure inside the reactor was about 1800 kPa. Reaction continued to proceed with tetrafluoroethylene participating in the polymerization, and there is a constant supply of tetrafluoroethylene gas to the reactor to maintain the pressure at about 1800 kPa. Reaction time for tetrafluoroethylene is about 45 minutes and the reaction was stopped.

The colloid mixture produced from the above reaction is a translucent, semi-clear dispersion. The solid polymer content is about 10% by weight. The average polymer particle size is about 76 nanometer (0.076 micrometer. The polymer particles have a core/shell structure, in which the core is polyfluoroacrylate and the shell is polytetrafluoroethylene. Thermogravimetric analysis results show the polymer particles contains about 2% by weight of fluoroacrylate-rich portion and 98% by weight of tetrafluoroethylene-rich portion, based on the fact that 2% by weight of the polymer decomposes in a temperature range of 300° to 460° C., which is a typical decomposition temperature of polyfluoroacrylate; and 98% by weight of the polymer decomposes in a temperature range of 460° to 760° C., which is a typical decomposition temperature range for polytetrafluoroethylene. Differential Scan Calorimetric analysis of the polymer shows a major exotherm at the peak of 333° C.

EXAMPLE 4

Coated Substrates

The colloidal dispersion produced from Example 1 and Example 2 was used to coat expanded microporous PTFE membranes obtained from W. L. Gore & Associates. The PTFE membrane has a general porosity of about 0.2 micrometer. The dispersions were applied to the membranes by spraying on one side of the membranes. The membranes were completely wetted by the dispersions. Excess fluid on the surface of the membranes was removed by dripping. The coated membranes were then placed in an oven at 200° C. for 3 minutes to remove water and surfactant.

The membranes coated with dispersions from Example 1 and Example 2 all have oil rating of 8 and remain similar air permeability to uncoated membranes, as were tested by Gurley. The coated or uncoated substrates all have Gurley numbers between 10 and 15 seconds.

I claim:

1. An aqueous dispersion of polymerized colloidal particles in which the particles have a core portion surrounded by a shell portion, in which:
    (a) the shell consists essentially of recurring units selected from the class consisting of:
        (i) tetrafluoroethylene; and
        (ii) tetrafluoroethylene and hexafluoropropylene; and
    (b) the core consists essentially of recurring units selected from the class consisting of:
        (i) a fluorinated alkyl acrylate, and
        (ii) a fluorinated alkyl methacrylate; and wherein the particles have an average particle size between 1 and 100 nanometers.

* * * * *